United States Patent
Salam et al.

(10) Patent No.: US 11,546,227 B2
(45) Date of Patent: Jan. 3, 2023

(54) OPTIMIZED DETECTION OF NETWORK DEFECT EXPOSURE IN NETWORK ENVIRONMENT

(71) Applicant: Cisco Technology, Inc., San Jose, CA (US)

(72) Inventors: Samer Salam, Beirut (LB); Ajay Madhavan, Milpitas, CA (US); Madhavan Kasthurirangan, Palo Alto, CA (US); Ram Prasanna Govind Krishnan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 438 days.

(21) Appl. No.: 16/368,735

(22) Filed: Mar. 28, 2019

(65) Prior Publication Data

US 2020/0162343 A1 May 21, 2020

Related U.S. Application Data (60) Provisional application No. 62/770,074, filed on Nov. 20, 2018.

(51) Int. Cl.
*H04L 41/16* (2022.01)
*G06N 5/02* (2006.01)
*H04L 41/0631* (2022.01)

(52) U.S. Cl.
CPC ............. *H04L 41/16* (2013.01); *G06N 5/025* (2013.01); *H04L 41/0636* (2013.01)

(58) Field of Classification Search
CPC . H04L 41/16; H04L 41/0636; H04L 43/0817; H04L 41/40; H04L 43/20; G06N 5/025; G06N 5/003
See application file for complete search history.

(56) References Cited

U.S. PATENT DOCUMENTS

| | | | |
|---|---|---|---|
| 7,069,512 B2 | 6/2006 | Harvey et al. | |
| 7,181,769 B1 | 2/2007 | Keanini et al. | |
| 7,668,953 B1 | 2/2010 | Sinclair et al. | |
| 7,809,822 B2 * | 10/2010 | Gotta | H04L 41/046 709/223 |
| 8,543,861 B1 | 9/2013 | Sawhney et al. | |
| 8,613,096 B2 | 12/2013 | Peinado et al. | |

(Continued)

*Primary Examiner* — Patrice L Winder
(74) *Attorney, Agent, or Firm* — Polsinelli (57) ABSTRACT

Present technology is directed to preferred processing and the verification of diagnostic signatures for a plurality of network defect. The disclosed optimization process is based on expressing each Diagnostic Signature as a minimal sum of product Boolean function of associated network commands, followed by ranking of each command reference in the product terms of the Boolean expression as well as each Boolean product terms of the SOP Boolean expressions, and constructing a decision tree based on the provided rankings to thereby determine a minimum set of commands along with an preferred command dispatch sequence for evaluating a Diagnostic Signature. Further aspects include the translation of both the optimization computation (interpretation of network conditions associated with a network defect) and the computed workflow (dispatch of the command) into a series of declarative rules that can be processed by a machine reasoning engine to thereby automate the optimization process.

17 Claims, 7 Drawing Sheets

(56) References Cited

U.S. PATENT DOCUMENTS

| | | | |
|---|---|---|---|
| 9,558,298 B2* | 1/2017 | Gotta | G06F 16/90344 |
| 10,951,540 B1* | 3/2021 | De Kadt | H04L 47/787 |
| 2020/0004618 A1* | 1/2020 | Thornhill | G06F 16/907 |

* cited by examiner

OPTIMIZED DETECTION OF NETWORK DEFECT EXPOSURE IN NETWORK ENVIRONMENT

CROSS-REFERENCE TO RELATED APPLICATIONS

This application claims priority to U.S. Provisional Patent Application No. 62/770,074, filed on Nov. 20, 2018, the content of which is incorporated herein by reference in its entirety.

TECHNICAL FIELD

The present technology pertains to systems and methods for optimizing network diagnostics performance. More specifically it is directed to preferred processing and cataloging of Diagnostic Signatures associated with network defects.

BACKGROUND

A network service team generally creates a Diagnostic Signature for each reported network defect. A Diagnostic Signature serves as a signature that identifies a set of network conditions linked to the presence of a network defect or security vulnerability to which a particular network element may be susceptible. The existence of, or susceptibility to, a network defect or a security vulnerability for a network device may be determined by an examination of certain key information with regards to device attributes, operational state, hardware platform, operating system version, and/or any configuration data that may be applied to a particular feature or protocol on a system. This information may be provided in a Diagnostic Signature associated with a particular network defect or security risk. Moreover, Diagnostic Signatures may also be used by a network operator to determine whether an outstanding service request or a network defect reported on a particular network element or customer premise device, corresponds to an already reported network defect. As the volume of network defect signatures increases as a consequence of increasing network size and complexity, the scalable and resource efficient implementation of such network defect technologies becomes a primary concern.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, methods for addressing the scalability challenges associated with the conventional scheme of fingerprinting network defects and security vulnerabilities. The present technology provides a preferred processing of diagnostic signatures, related to an operator identified network defect that may be utilized, for example, to determine whether a newly received Service report pertaining to a network defect corresponds to a known defect signature. A mechanism disclosed in accordance with some embodiments of the present technology involves analyzing an entire set of Diagnostic Signatures in order to identify a preferred sequence of data collection queries (i.e., CLI command dispatch) in a way that avoids collecting a particular piece of data unless it is absolutely required.

One process for cataloguing a reported network defect against an inventory of existing Diagnostic Signatures associated with known network issues (Network defect fingerprinting process) involves a brute force approach based on conducting an exhaustive collection of data on all the conditions associated with each Diagnostic Signature and appropriate processing of the collected data in order to determine whether all the conditions have presented themselves to match a known Diagnostic signature. However, the brute force approach of indiscriminately collecting data on all the conditions associated with a defect signature by dispatching all the associated data query commands may prove expensive in terms of both the turn-around time as well as the processing load imposed on the queried network devices and the network controller. This situation is further exacerbated given the large and continuously growing number of Diagnostic Signatures in an average network (in the thousands). As such, the brute force approach does not lend itself to a feasible solution. In order to address this issue a more preferred system and method for processing Diagnostic Signatures in a faster and more resource-efficient manner, is put forth herein.

In one aspect of the present technology, a method includes: representing each of a plurality of network diagnostic signatures as a sum-of-product Boolean function of one or more network conditions, wherein each of the one or more network conditions is asserted by a respective one of the one or more network commands; sorting each of a plurality of network commands in a decreasing order based on a corresponding frequency of occurrence across the plurality of network diagnostic signatures; and constructing a decision tree for a plurality of sorted network commands to thereby compute a preferred execution sequence for the plurality of network commands.

In one aspect of the present technology, a method includes: identifying two or more network diagnostic signatures, each of which corresponds to a presence of one or more network conditions, wherein a presence of each of the one or more network conditions is asserted by issuance of a corresponding network command; representing the two or more network diagnostic signatures as two or more sequences of network commands each effective to evaluate a respective one of the two or more network diagnostic signatures; and executing a plurality of network commands in the two or more sequences of network commands in an order that minimizes one or more compute resources.

In one aspect of the present technology, a system comprises one or more processors; and at least one computer-readable storage medium having stored therein instructions which, when executed by the one or more processors, cause the system to: represent each of a plurality of network diagnostic signatures as a sum-of-product Boolean function of one or more network conditions, wherein each of the one or more network condition is asserted by a corresponding network command; replace each of the one or more network conditions with the corresponding network command to thereby represent each of the plurality of network diagnostic signatures as a sum of one or more Boolean product terms, each of which is a function of one or more network commands; sort the one or more network commands, in each of the one or more Boolean product terms, in a decreasing order based on a corresponding frequency of occurrence across the plurality of network diagnostic signatures; sort the one or more Boolean product terms, in each of the plurality of network diagnostic signatures, in a decreasing order based on a number of network commands specified in each of the one or more Boolean product terms; and construct a decision tree to compute a preferred execution sequence for the plurality of network commands to, thereby evaluate each of the plurality of network diagnostic.

Detailed Description of Example Embodiments

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure.

As described, a Diagnostic Signature (DS) created for an operator identified network defect that captures a set of (CLI) commands as well as the associated output values that need to be asserted for a particular network defect to be applicable to a particular network device. The output values generated by the set of CLI commands (output values representing a set of network/device conditions associated a network defect) may then be used to determine if a network defect associated with an incoming Service Request is related to an already known network defect. The information captured in a Diagnostic signature may also be translated into a formal (machine readable/interpretable) semantic model in order to allow a network controller and/or analytics platform to proactively determine whether a defect is present in the network devices by collecting the applicable data dynamically from the network and applying machine learning or reasoning over the data.

Some embodiments of the present technology are directed to a mechanism for analyzing an entire set of Diagnostic Signatures in order to identify a preferred sequence of data collection/query commands (CLI command dispatch sequence) that avoids collecting a particular piece of data unless it is absolutely required. The mechanism for determining a preferred pattern of data collection for asserting or identifying a Diagnostic Signature of a network defect in a fast and resource-efficient manner exploits the fact that detection of defect signatures is performed using a decision tree where typically more than one parallel branch of the decision tree may lead to the same outcome. Accordingly, a preferred command dispatch strategy, as provided by some embodiments of the present technology, may involve deferring collection of a particular piece of data with the optimistic hope that it will not be required (i.e. a different branch in the decision tree will be taken).

An optimization of a Diagnostic Signature verification process, in accordance to some embodiments of the present technology, is based on determining a dispatch pattern for a minimum set of commands required to identify a Diagnostic Signature of a network defect. Accordingly, a network controller may express the Diagnostic Signatures of known network defects as a logical function of one or more network conditions or one or more network commands that assert or verify the presence or absence of the said conditions. Following this, a network controller, or an optimization service/system running on the network controller, may express the logical statement of the Diagnostic Signatures as a Boolean Sum-of-Products (SOP) function of one or more associated network conditions (i.e., corresponding to a logical sum of two or more logical product terms). Subsequently, the network controller equipped with an optimization routine may associate each of the conditions specified in the SOP logical form of the Diagnostic Signatures to a corresponding (CLI) command (i.e., a command that may be issued to assert the particular condition). The optimization routine may redefine the Sum-of-Products (SOP) Boolean expression as a function of the corresponding network commands, or alternatively, it may leave the Sum-of-Products (SOP) Boolean expressions unchanged and save the association between defect-associated network conditions and network commands for asserting/verifying the said conditions elsewhere on the controller platform. The optimization service may then compute a frequency of occurrence (observation count) for each (CLI) command across all the product terms (conjunctions) of the Sum-of-Products (SOP) forms and assign a rank to each network command based on the frequency of occurrence across the Diagnostic Signatures and a network cost associated with issuing the command.

In some embodiments of the present technology, a ranking of a command is determined based on both the occurrence count of the command in the Diagnostic Signature Sum-of-Products (SOP) form and a consideration of the network cost incurred by issuing the command. For example, a network cost of a command associated with retrieval of a piece of data that is already pre-collected on the controller is less than that for which a request to the corresponding network device is required.

In accordance with some embodiments of the present technology, an optimization system running on a network controller may translate both the interpretation of the conditions and the dispatch of the command into a series of declarative rules that a machine reasoning engine can consume and operate on. These rules may then be fed to a machine reasoning engine to sequence the data collection and detect the conditions of the defect signatures. As such, both the computation of the optimization process as well as the optimization workflow may be translated into a series of rules that can be operated on by the machine reasoning engine.

After an optimization system has computed a rank, for each of the conditions (or equivalently the commands for asserting the said conditions) specified in the product terms of the minimal Sum-Of-Product expressions (based on frequency with which a command is referenced across all the provided Diagnostic Signatures), it may proceed to rank the different product terms of the Sum-of-Products (SOP) Booleans forms based on the ranking of the constituent commands/conditions in the product term. Subsequently, a preferred sequence of command issuance/execution is identified based on the determined rankings of the constituent commands as well as that of the Boolean product terms.

The above-described process, in accordance with some embodiments of the present technology, is clarified by way of an example involving four Diagnostic Signatures (DS1-DS4) logically expressed as a function of one or more example conditions as shown in the following:

$$DS1: \text{Logic} = \text{Condition1} \&\& \text{Condition2} \quad (1)$$

$$DS2: \text{Logic} = (\text{Condition}A \&\& \text{Condition}C) \| \text{Condition}B \quad (2)$$

$$DS3: \text{Logic} = \text{Condition}X \&\& [(\text{Condition}Z \&\& \text{Condition}Y) \| \text{Condition}V] \quad (3)$$

$$DS4: \text{Logic} = \text{Condition}W \quad (4)$$

Each of the conditions in the logical expressions of the four example Diagnostic Signatures (DS1-DS4) references a particular CLI command, as follows:

Condition 1: Command A
Condition 2: Command B
Condition A: Command A
Condition B: Command B
Condition C: Command C
Condition X: Command A
Condition Y: Command C
Condition Z: Command D
Condition V: Command B
Condition W: Command W Initially, the logical statement of each Diagnostic Signature is examined in order to have the corresponding logical expression restated in a minimal disjunctive form (i.e. Boolean Sum of Products form). The logical expressions for the first Diagnostic Signature (DS1) and the second Diagnostic Signature (DS2), in the current example, are already in the minimal disjunctive form (i.e., expressed as a Boolean Sum of Products). The logical expression corresponding to the third Diagnostic Signature (DS3) may be restated in a minimal disjunctive form as shown:

$$DS3: \text{Logic} = (\text{Condition}X \&\& \text{Condition}Z \&\& \text{Condition}Y) \| (\text{Condition}X \&\& \text{Condition}V)$$

Following a computation of a minimal disjunctive form for all of the Diagnostic Signatures (expressed as logical expressions), a second step involves identifying a number of references of each command in the product terms of the Sum-of-Products (SOP) forms. In some embodiments this may be determined by replacing each condition in the minimal disjunctive logical expressions of the Diagnostic Signatures with a corresponding (CLI) command for that condition, to thereby provide a set of Diagnostic signatures expressed as a set of Sum-of-Products (SOP) Boolean functions of relevant (CLI) commands. A count for the number of times each command is referenced in the set of Diagnostic Signatures may then be determined. With reference to the current example:

Command A, corresponding to conditions 1, A and X, appears in 4 product terms.

Command B, corresponding to conditions 2, B and V, appears in 3 product terms.

Command C, corresponding to conditions C and Y, appears in 2 products.

Command D, corresponding to condition Z, appears in 1 product.

Command W, corresponding to condition W, appears in 1 product.

Next, the product terms of the Sum-of-Products (SOP) form in the logic of each Diagnostic Signature (DS) are sorted based on the decreasing reference count of commands required by the constituent conditions. The Conditions within a product term are similarly sorted based on the same criterion. For example, the logic for DS3 becomes:

DS3:Logic=(Condition$X$&& Condition$Y$&& Condition$Z$)||(Condition$X$&& Condition$V$)

The next step involves constructing a decision tree for the dispatch of the (CLI) commands, and evaluation of their results. The tree starts with a node for the highest ranking command from the highest ranking product term of each Diagnostic Signature. Each such node has a child node which is the second-highest ranking command of the highest ranking product term, and so on. The transition from the parent node (corresponding to the highest ranking command in the highest ranking product term) to the child node (corresponding to the second-highest ranking command in the highest ranking product term) occurs only if the condition of the first command (represented by a parent node) is satisfied, otherwise, the highest ranking command of the second-highest ranking product term is dispatched instead. This decision tree is more optimized in a sense that it will only issue a command if absolutely required to evaluate a Diagnostic Signature, and will trim any commands which map to "don't care" branches (i.e., the assertion of the command-associated condition is redundant in evaluating a Diagnostic Signature). The execution of the decision tree may proceed along multiple branches in parallel.

Figure 1:
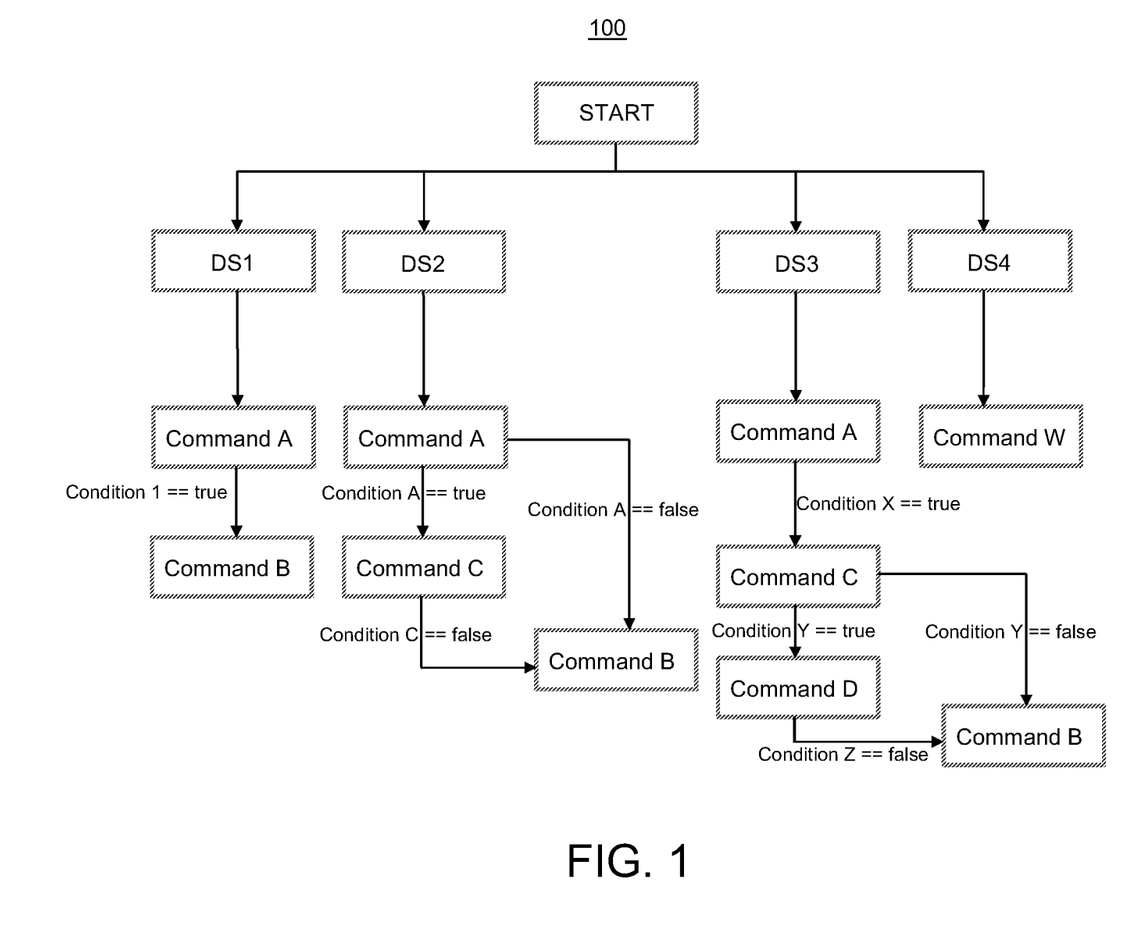
FIG. 1 illustrate a decision tree for determining a preferred sequence of commands dispatch required for a set of Diagnostic Signatures, in accordance with some embodiments of the present technology.

FIG. 1 shows an example decision tree 100 for the four example Diagnostic Signatures (DS1-DS4) in the previous example. Note that, in the decision tree 100, execution can proceed along multiple branches in parallel. Referring back to the decision tree 100, each branch coincides with the valuation of a different Diagnostic Signature. Expressing the Sum-of-Products (SOP) logical expression for DS1-DS4 as a function of corresponding commands is achieved by substituting each condition specified in Sum-of-Products (SOP) form Diagnostic Signatures shown in (1)-(4), with a referenced/associated command for each condition. After sorting the commands within each product term and the product terms within each minimal Sum-of-Products (SOP) logical expression in a decreasing order of rank the following expressions for the Diagnostic Signatures (DS1-DS4) are obtained:

DS1:Logic=Command$A$&& Command$B$

DS2:Logic=(Command$A$&& Command$C$)||Command$B$

DS3:Logic=(Command$A$&& Command$C$&& Command$D$)||(Command$A$&& Command$B$)

DS4:Logic=Command$W$

According to the decision tree 100, a command dispatch sequence for evaluating the first Diagnostic Signature (DS1) starts with a dispatch of command A, for verifying condition 1, followed by a dispatch of command B only if condition 1 is asserted. Otherwise, DS1 is not a match and there is no need to waste time and resources to dispatch command B for verifying condition 2. Similarly, a sequence of command dispatches for evaluating the second Diagnostic Signature (DS2) includes a dispatch of command A followed by the dispatch of command C only if condition A, associated with command A, is asserted. Otherwise, command B is issued instead. Therefore command B is only issued if either of the conditions (A and C) associated, respectively, with commands A or C returns false. The evaluation of the third Diagnostic Signature (DS 3) includes a dispatch of command A followed by a dispatch of command C only if condition X, associated with command A, is asserted. Otherwise, DS 3 is not matched and no further data collection steps are required. Following a dispatch of command C (i.e., if condition X associated with the output of command A is asserted) and subsequent verification that condition Y is asserted by the output command C, command D for an assertion of condition Z is dispatched. If the output of command D asserts the presence of the associated condition (condition Z) the evaluation of DS3 is complete as the presence of third Diagnostic Signature is verified based on an assertion of conditions X, Y, and Z. If the output of command C associated with condition Y is not asserted, command B, instead of command D is dispatched.

According to some embodiments of the present technology, the preferred decision tree, such as decision tree 100 in FIG. 1, may be compiled automatically from the Diagnostic Signature definitions and captured in the form of Semantic Web Rule Language (SWRL) rules that may be applied using a Semantic Reasoner (reasoning engine). This approach, as described in accordance to some embodiments, allows a given command to be dispatched once, and its output to be "remembered" as the processing progresses down the various branches of the decision tree, thereby eliminating the need to fetch the same data multiple times. Furthermore, it provides preferred processing in terms of applying the pattern matching on the output of the commands.

Figure 2:
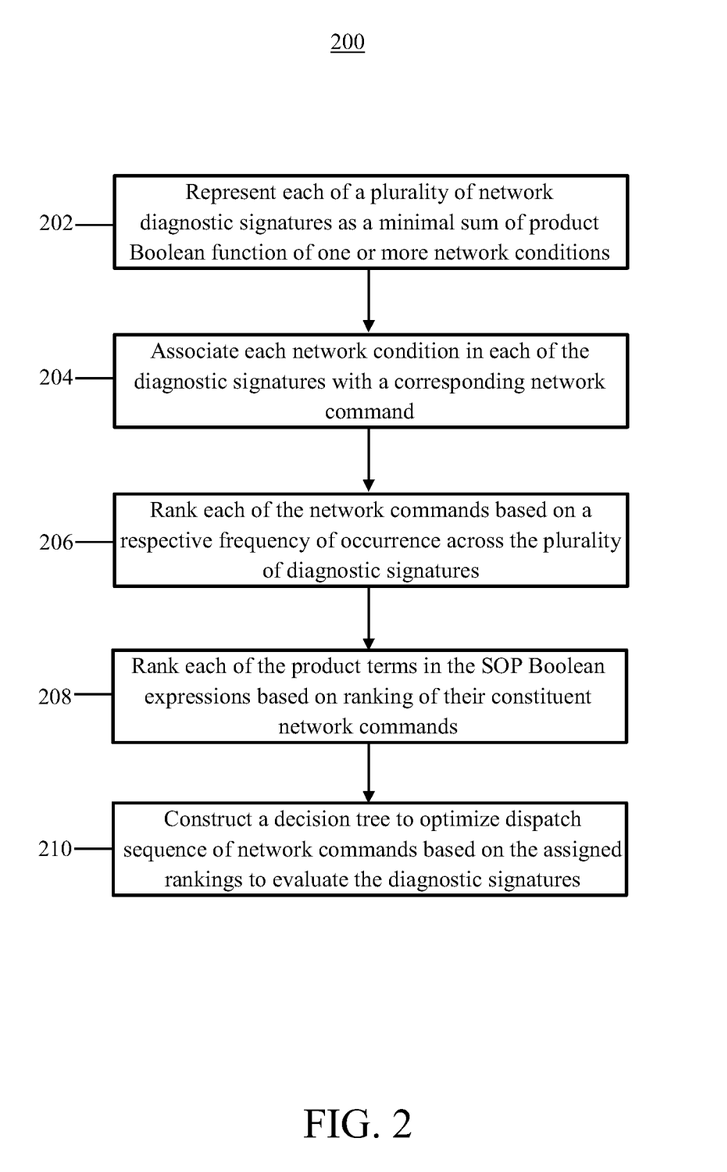
FIG. 2 illustrate a flow chart for a preferred processing of Diagnostic Signatures in accordance with some embodiments of the present technology.

Flow chart 200 in FIG. 2 illustrates an example workflow corresponding to a preferred processing of Diagnostic Signatures, in accordance with some embodiments of the present technology. At step 202 a set of existing Diagnostic Signatures, expressed as a logical function of one or more network conditions is represented as a minimal sum-of-product (SOP) Boolean function of one or more network conditions. Step 204 represents an intermediate state wherein each reference to a network condition in the Sum-of-Products (SOP) Boolean representation of the Diagnostic Signatures is associated with a corresponding network command. Subsequently, at step 206, the network commands specified in the Sum-of-Products (SOP) Boolean representation of the Diagnostic Signatures are ranked based on their frequency of occurrence or reference count in the Boolean expressions of the Diagnostic Signatures, as well as a network cost parameter associated with issuing the said command. Furthermore, at step 208 each product term in each of the Diagnostic Signatures (expressed as Sum-of-Products (SOP) Boolean function of one or more network commands) is ranked in accordance to the ranking of the constituent network commands. The command references in each product term as well the product term in each Sum-of-Products (SOP) Boolean expressions are sorted based on a decreasing order of rank, and at step 210, a decision tree for a preferred command dispatch sequence to evaluate each Diagnostic Signature is constructed from the sorted Sum-of-Products (SOP) Boolean expressions.

In accordance with some embodiments, the present technology may be implemented in the context of a Cisco's Digital Network Architecture Center (Cisco DNA Center) which is a foundational controller and analytics platform for an intent-based enterprise network.

Figure 3:
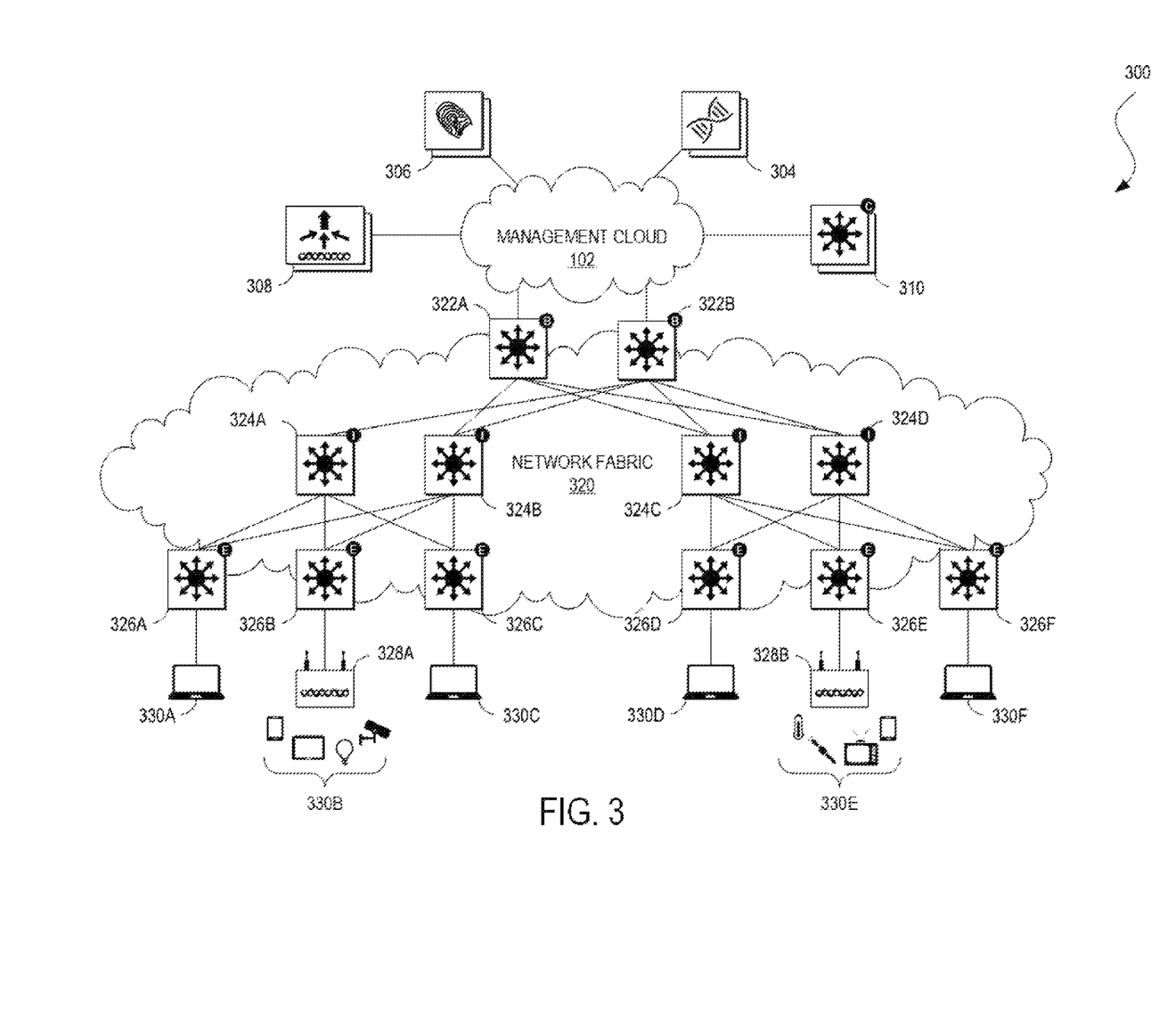
FIG. 3 illustrates an example network device in accordance with some embodiments of the present technology.
Figure 4:
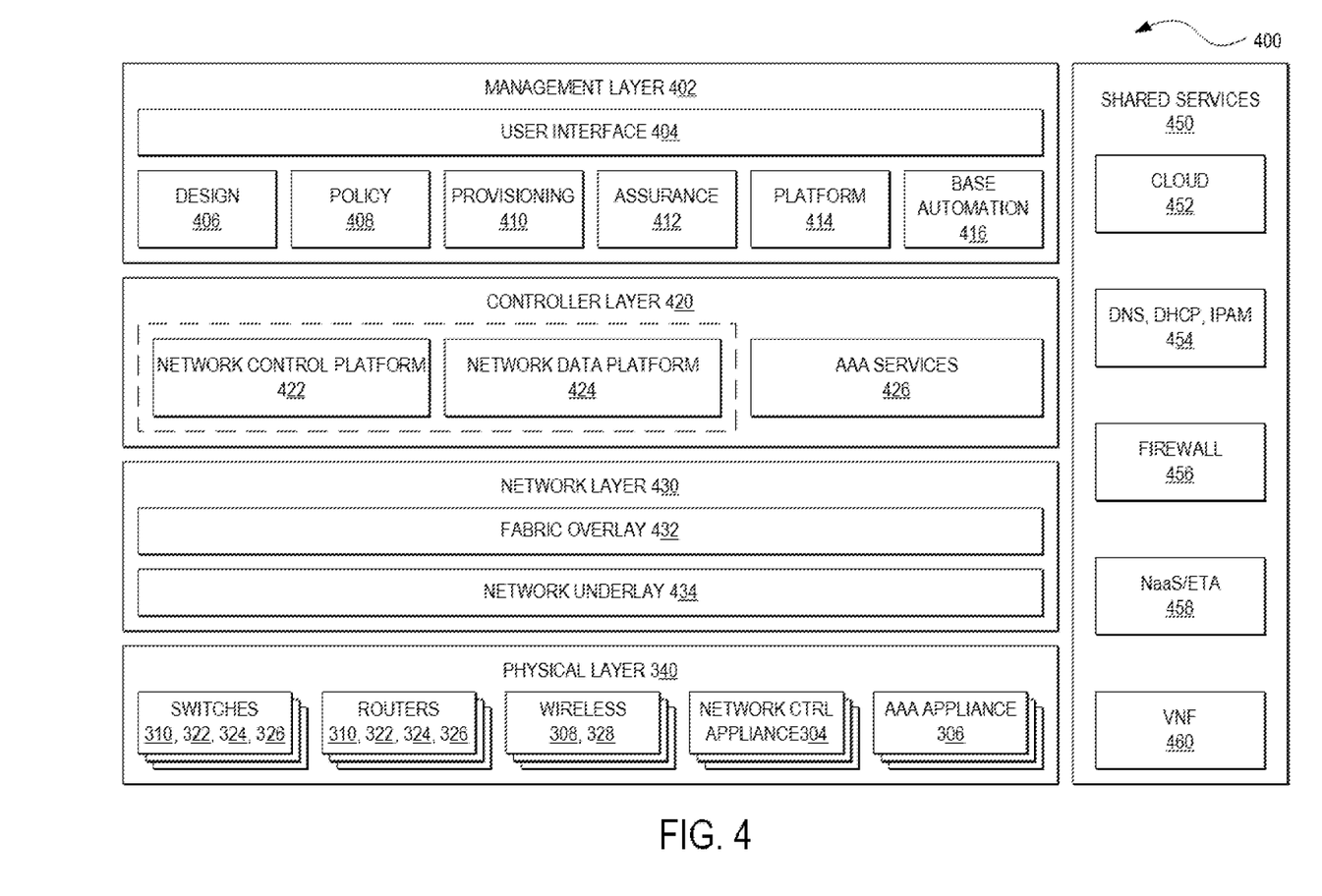
FIG. 4 illustrates an example architecture of a computing device, in accordance with some embodiments of the present technology.
Figure 5:
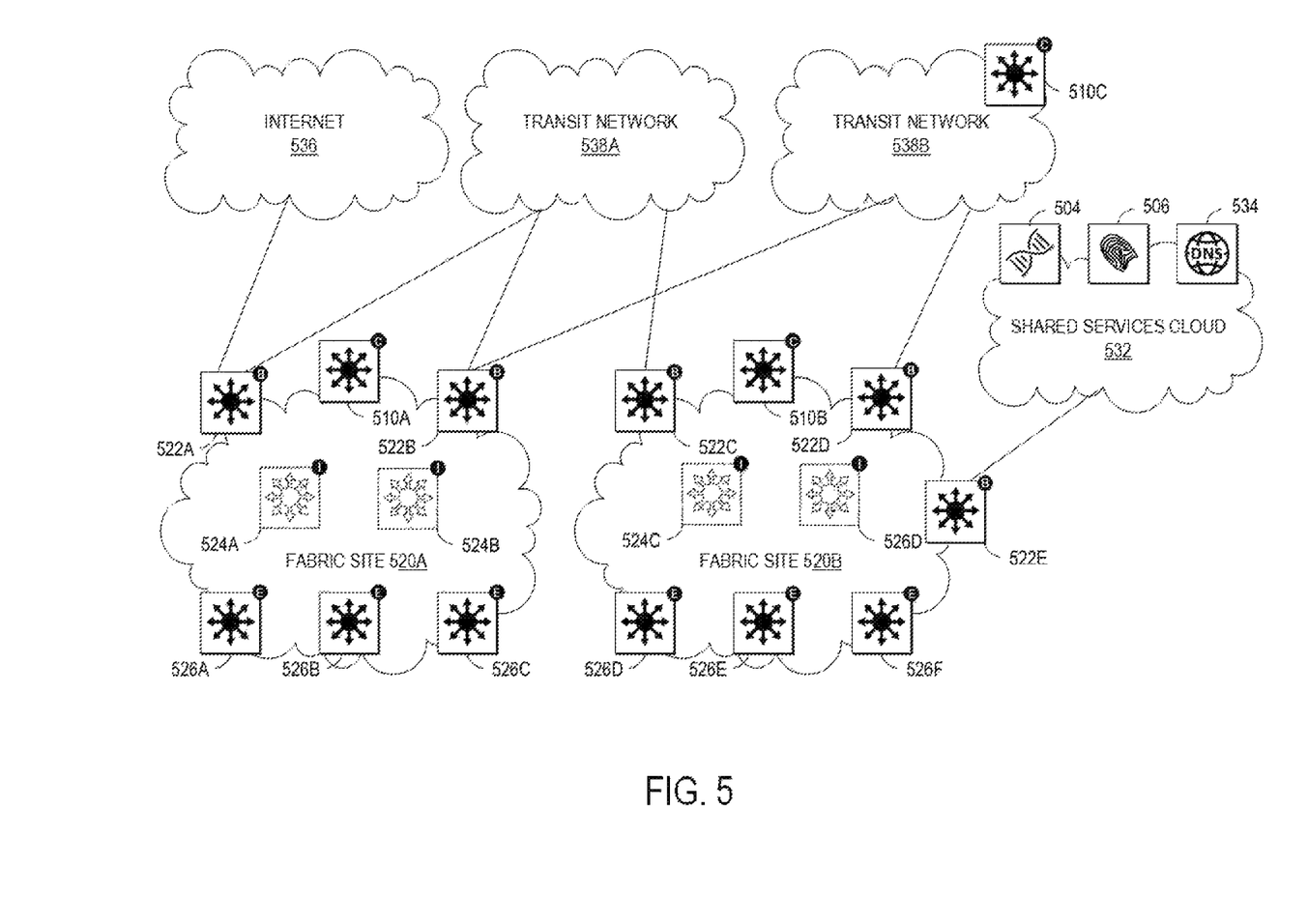
FIG. 5 illustrates an example of a physical topology for a multi-site enterprise network, in accordance with some embodiments of the present invention.

The disclosure now turns to FIGS. 3, 4 and 5 to provide a structural and operational description of some aspects of DNA-C.

FIG. 3 illustrates an example of a physical topology of an enterprise network 300 for providing intent-based networking. It should be understood that, for the enterprise network 300 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 300 can include any number or type of resources, which can be accessed and utilized by endpoints or network devices. The illustrations and examples provided herein are for clarity and simplicity.

In this example, the enterprise network 300 includes a management cloud 302 and a network fabric 320. Although shown as an external network or cloud to the network fabric 320 in this example, the management cloud 302 may alternatively or additionally reside on the premises of an organization or in a colocation center (in addition to being hosted by a cloud provider or similar environment). The management cloud 302 can provide a central management plane for building and operating the network fabric 320. The management cloud 302 can be responsible for forwarding configuration and policy distribution, as well as device management and analytics. The management cloud 302 can comprise one or more network controller appliances 304, one or more authentication, authorization, and accounting (AAA) appliances 306, one or more wireless local area network controllers (WLCs) 308, and one or more fabric control plane nodes 310. In other embodiments, one or more elements of the management cloud 302 may be co-located with the network fabric 320.

The network controller appliance(s) 304 can function as the command and control system for one or more network fabrics and can house automated workflows for deploying and managing the network fabric(s). The network controller appliance(s) 304 can include automation, design, policy, provisioning, and assurance capabilities, among others, as discussed further below with respect to FIG. 4. In some embodiments, one or more Cisco Digital Network Architecture (Cisco DNA™) appliances can operate as the network controller appliance(s) 304.

The AAA appliance(s) 306 can control access to computing resources, facilitate enforcement of network policies, audit usage, and provide information necessary to bill for services. The AAA appliance can interact with the network controller appliance(s) 304 and with databases and directories containing information for users, devices, things, policies, billing, and similar information to provide authentication, authorization, and accounting services. In some embodiments, the AAA appliance(s) 306 can utilize Remote Authentication Dial-In User Service (RADIUS) or Diameter to communicate with devices and applications. In some embodiments, one or more Cisco® Identity Services Engine (ISE) appliances can operate as the AAA appliance(s) 306.

The WLC(s) 308 can support fabric-enabled access points attached to the network fabric 320, handling traditional tasks associated with a WLC as well as interactions with the fabric control plane for wireless endpoint registration and roaming. In some embodiments, the network fabric 320 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 308.

The network fabric 320 can comprise fabric border nodes 322A and 322B (collectively, 322), fabric intermediate nodes 324A-D (collectively, 324), and fabric edge nodes 326A-F (collectively, 326). Although the fabric control plane node(s) 310 are shown to be external to the network fabric 320 in this example, in other embodiments, the fabric control plane node(s) 310 may be co-located with the network fabric 320. In embodiments where the fabric control plane node(s) 310 are co-located with the network fabric 320, the fabric control plane node(s) 310 may comprise a dedicated node or set of nodes or the functionality of the fabric control node(s) 310 may be implemented by the fabric border nodes 322.

The fabric control plane node(s) 310 can serve as a central database for tracking all users, devices, and things as they attach to the network fabric 320, and as they roam around. The fabric control plane node(s) 310 can allow network infrastructure (e.g., switches, routers, WLCs, etc.) to query the database to determine the locations of users, devices, and things attached to the fabric instead of using a flood and learn mechanism. In this manner, the fabric control plane node(s) 310 can operate as a single source of truth about where every endpoint attached to the network fabric 320 is located at any point in time. In addition to tracking specific endpoints (e.g., /32 address for IPv4, /328 address for IPv6, etc.), the fabric control plane node(s) 310 can also track larger summarized routers (e.g., IP/mask). This flexibility can help in summarization across fabric sites and improve overall scalability.

The fabric border nodes 322 can connect the network fabric 320 to traditional Layer 3 networks (e.g., non-fabric networks) or to different fabric sites. The fabric border nodes 322 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 322 can also exchange reachability and policy information with fabric control plane nodes of different fabric sites. The fabric border nodes 322 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 324 can operate as pure Layer 3 forwarders that connect the fabric border nodes 322 to the fabric edge nodes 326 and provide the Layer 3 underlay for fabric overlay traffic.

The fabric edge nodes 326 can connect endpoints to the network fabric 320 and can encapsulate/decapsulate and forward traffic from these endpoints to and from the network fabric. The fabric edge nodes 326 may operate at the perimeter of the network fabric 320 and can be the first points for the attachment of users, devices, and things and the implementation of policy. In some embodiments, the network fabric 320 can also include fabric extended nodes (not shown) for attaching downstream non-fabric Layer 2 network devices to the network fabric 320 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 326 for communication to outside subnets.

In this example, the network fabric can represent a single fabric site deployment which can be differentiated from a multi-site fabric deployment as discussed further below with respect to FIG. 5.

In some embodiments, all subnets hosted in a fabric site can be provisioned across every fabric edge node 326 in that fabric site. For example, if the subnet 10.10.10.0/24 is provisioned in a given fabric site, this subnet may be defined across all of the fabric edge nodes 326 in that fabric site, and endpoints located in that subnet can be placed on any fabric edge node 326 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Computer Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 322, 324, and 326.

The enterprise network 300 can also include wired endpoints 330A, 330C, 330D, and 330F and wireless endpoints 330B and 330E (collectively, 330). The wired endpoints 330A, 330C, 330D, and 330F can connect by wire to fabric edge nodes 326A, 326C, 326D, and 326F, respectively, and the wireless endpoints 330B and 330E can connect wirelessly to wireless access points 328B and 328E (collectively, 328), respectively, which in turn can connect by wire to fabric edge nodes 326B and 326E, respectively. In some embodiments, Cisco Aironet® access points, Cisco Meraki® MR access points, and/or other Cisco DNA™-ready access points can operate as the wireless access points 328.

The endpoints 330 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 330 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 320 can support wired and wireless access as part of a single integrated infrastructure such that connectivity, mobility, and policy enforcement behavior are similar or the same for both wired and wireless endpoints. This can bring a unified experience for users, devices, and things that are independent of the access media.

In integrated wired and wireless deployments, control plane integration can be achieved with the WLC(s) 308 notifying the fabric control plane node(s) 310 of joins, roams, and disconnects by the wireless endpoints 330 such that the fabric control plane node(s) can have connectivity information about both wired and wireless endpoints in the network fabric 320, and can serve as the single source of truth for endpoints connected to the network fabric. For data plane integration, the WLC(s) 308 can instruct the fabric wireless access points 328 to form a VXLAN overlay tunnel to their adjacent fabric edge nodes 326. The AP VXLAN tunnel can carry segmentation and policy information to and from the fabric edge nodes 326, allowing connectivity and functionality identical or similar to that of a wired endpoint. When the wireless endpoints 330 join the network fabric 320 via the fabric wireless access points 328, the WLC(s) 308 can onboard the endpoints into the network fabric 320 and inform the fabric control plane node(s) 310 of the endpoints' Media Access Control (MAC) addresses. The WLC(s) 308 can then instruct the fabric wireless access points 328 to form VXLAN overlay tunnels to the adjacent fabric edge nodes 326. Next, the wireless endpoints 330 can obtain IP addresses for themselves via Dynamic Host Configuration Protocol (DHCP). Once that completes, the fabric edge nodes 326 can register the IP addresses of the wireless endpoint 330 to the fabric control plane node(s) 310 to form a mapping between the endpoints' MAC and IP addresses, and traffic to and from the wireless endpoints 330 can begin to flow.

FIG. 4 illustrates an example of a logical architecture 400 for an enterprise network (e.g., the enterprise network 300). One of ordinary skill in the art will understand that, for the logical architecture 400 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 400 includes a management layer 402, a controller layer 420, a network layer 430 (such as embodied by the network fabric 320), a physical layer 440 (such as embodied by the various elements of FIG. 3), and a shared services layer 450.

The management layer 402 can abstract the complexities and dependencies of other layers and provide a user with tools and workflows to manage an enterprise network (e.g., the enterprise network 300). The management layer 402 can include a user interface 404, design functions 406, policy functions 404, provisioning functions 410, assurance functions 412, platform functions 414, and base automation functions 416. The user interface 404 can provide a user with a single point to manage and automate the network. The user interface 404 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or another suitable interface in which the user can configure network infrastructure, devices, and things that are cloud-managed; provide user preferences; specify policies, enter data; review statistics; configure interactions or operations; and so forth. The user interface 404 may also provide visibility information, such as views of a network, network infrastructure, computing devices, and things. For example, the user interface 404 can provide a view of the status or conditions of the network, the operations taking place, services, performance, topology or layout, protocols implemented, running processes, errors, notifications, alerts, network structure, ongoing communications, data analysis, and so forth.

The design functions 406 can include tools and workflows for managing site profiles, maps, and floor plans, network settings, and IP address management, among others. The policy functions 408 can include tools and workflows for defining and managing network policies. The provisioning functions 410 can include tools and workflows for deploying the network. The assurance functions 412 can use machine learning and analytics to provide end-to-end visibility of the network by learning from the network infrastructure, endpoints, and other contextual sources of information. The platform functions 414 can include tools and workflows for integrating the network management system with other technologies. The base automation functions 416 can include tools and workflows to support the policy functions 408, the provisioning functions 410, the assurance functions 412, and the platform functions 414.

In some embodiments, the design functions 406, the policy functions 408, the provisioning functions 410, the assurance functions 412, the platform functions 414, and the base automation functions 416 can be implemented as microservices in which respective software functions are implemented in multiple containers communicating with each rather than amalgamating all tools and workflows into a single software binary. Each of the design functions 406, policy functions 408, provisioning functions 410, assurance functions 412, and platform functions 414 can be viewed as a set of related automation microservices to cover the design, policy authoring, provisioning, assurance, and cross-platform integration phases of the network lifecycle. The base automation functions 414 can support the top-level functions by allowing users to perform certain network-wide tasks.

Returning to FIG. 4, the controller layer 420 can comprise subsystems for the management layer 420 and may include a network control platform 422, a network data platform 424, and AAA services 426. These controller subsystems can form an abstraction layer to hide the complexities and dependencies of managing many network elements and protocols.

The network control platform 422 can provide automation and orchestration services for the network layer 430 and the physical layer 440, and can include the settings, protocols, and tables to automate management of the network and physical layers. For example, the network control platform 430 can provide the design functions 406, the provisioning functions 410. In addition, the network control platform 430 can include tools and workflows for discovering switches, routers, wireless controllers, and other network infrastructure devices (e.g., the network discovery tool); maintaining network and endpoint details, configurations, and software versions (e.g., the inventory management tool); Plug-and-Play (PnP) for automating deployment of network infrastructure (e.g., the network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 422 can communicate with network elements using Network Configuration (NETCONF)/Yet Another Next Generation (YANG), Simple Network Management Protocol (SNMP), Secure Shell (SSH)/Telnet, and so forth. A function of evaluating a minimal set of network commands, corresponding to a collection of a minimal set of network health related data, required to verify a presence of one or more network defect signatures may also be performed by the network control platform 422. In some embodiments, the Cisco® Network Control Platform (NCP) can operate as the network control platform 422

The network data platform 424 can provide for network data collection, analytics, and assurance, and may include the settings, protocols, and tables to monitor and analyze network infrastructure and endpoints connected to the network. The network data platform 424 can collect multiple types of information from network infrastructure devices, including Syslog, SNMP, NetFlow, Switched Port Analyzer (SPAN), streaming telemetry, and network diagnostic information corresponding to various network defect signature among others. The network data platform 424 can also collect use contextual information shared from In some embodiments, one or more Cisco DNA™ Center appliances can provide the functionalities of the management layer 410, the network control platform 422, and the network data platform 424. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third-party vendors. The Cisco DNA™ Center appliances can also be cloud-tethered to provide for the upgrade of existing functions and additions of new packages and applications without having to manually download and install them.

The AAA services 426 can provide identity and policy services for the network layer 430 and physical layer 440, and may include the settings, protocols, and tables to support endpoint identification and policy enforcement services. The AAA services 426 can provide tools and workflows to manage virtual networks and security groups and to create group-based policies and contracts. The AAA services 426 can identify and profile network infrastructure devices and endpoints using AAA/RADIUS, 802.1X, MAC Authentication Bypass (MAB), web authentication, and EasyConnect, among others. The AAA services 426 can also collect and use contextual information from the network control platform 422, the network data platform 424, and the shared services 450, among others. In some embodiments, Cisco® ISE can provide the AAA services 426.

The network layer 430 can be conceptualized as a composition of two layers, an underlay 434 comprising physical and virtual network infrastructure (e.g., routers, switches, WLCs, etc.) and a Layer 3 routing protocol for forwarding traffic, and an overlay 432 comprising a virtual topology for logically connecting wired and wireless users, devices, and things and applying services and policies to these entities. Network elements of the underlay 434 can establish connectivity between each other, such as via Internet Protocol (IP). The underlay may use any topology and routing protocol.

In some embodiments, the network controller 304 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 432 can be a logical, virtualized topology built on top of the physical underlay 434, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 320, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 320 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 320 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 320. It can be used as source and destination classifiers in Scalable Group ACLs (SGACLs). The SGT can be used to provide address-agnostic group-based policies.

In some embodiments, the fabric control plane node 310 may implement the Locator/Identifier Separation Protocol (LISP) to communicate with one another and with the management cloud 302. Thus, the control plane nodes may operate a host tracking database, a map server, and a map resolver. The host tracking database can track the endpoints 330 connected to the network fabric 320 and associate the endpoints to the fabric edge nodes 326, thereby decoupling an endpoint's identifier (e.g., IP or MAC address) from its location (e.g., closest router) in the network.

The physical layer 440 can comprise network infrastructure devices, such as switches and routers 310, 322, 324, and 326 and wireless elements 308 and 328 and network appliances, such as the network controller appliance(s) 304, and the AAA appliance(s) 306.

The shared services layer 450 can provide an interface to external network services, such as cloud services 452; Domain Name System (DNS), DHCP, IP Address Management (IPAM), and other network address management services 454; firewall services 456; Network as a Sensor (Naas)/Encrypted Threat Analytics (ETA) services; and Virtual Network Functions (VNFs) 460; among others. The management layer 402 and/or the controller layer 420 can share identity, policy, forwarding information, and so forth via the shared services layer 450 using APIs.

FIG. 5 illustrates an example of a physical topology for a multi-site enterprise network 500. In this example, the network fabric comprises fabric sites 520A and 520B. The fabric site 520A can include a fabric control node 510A, fabric border nodes 522A and 522B, fabric intermediate nodes 524A and 524B (shown here in dashed line and not connected to the fabric border nodes or the fabric edge nodes for simplicity), and fabric edge nodes 526A-D. The fabric site 520B can include a fabric control node 510B, fabric border nodes 522C-E, fabric intermediate nodes 524C and 524D, and fabric edge nodes 526D-F. Multiple fabric sites corresponding to a single fabric, such as the network fabric of FIG. 5, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 536, traditional WAN 538A, Software-Defined WAN (SD-WAN) (not shown), or Software-Defined Access (SD-Access) 538B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 320). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing the overall scalability of the network.

The control plane in the transit network can hold summary state for all fabric sites that it interconnects. This information can be registered to the transit control plane by a border from different fabric sites. The border nodes can register EID information from the local fabric site into the transit network control plane for summary EIDs only and thus further improve scalability.

The multi-site enterprise network 500 can also include a shared services cloud 532. The shared services cloud 532 can comprise one or more network controller appliances 504, one or more AAA appliances 506, and other shared servers (e.g., DNS; DHCP; IPAM; SNMP and other monitoring tools; NetFlow, Syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.)

Figure 6:
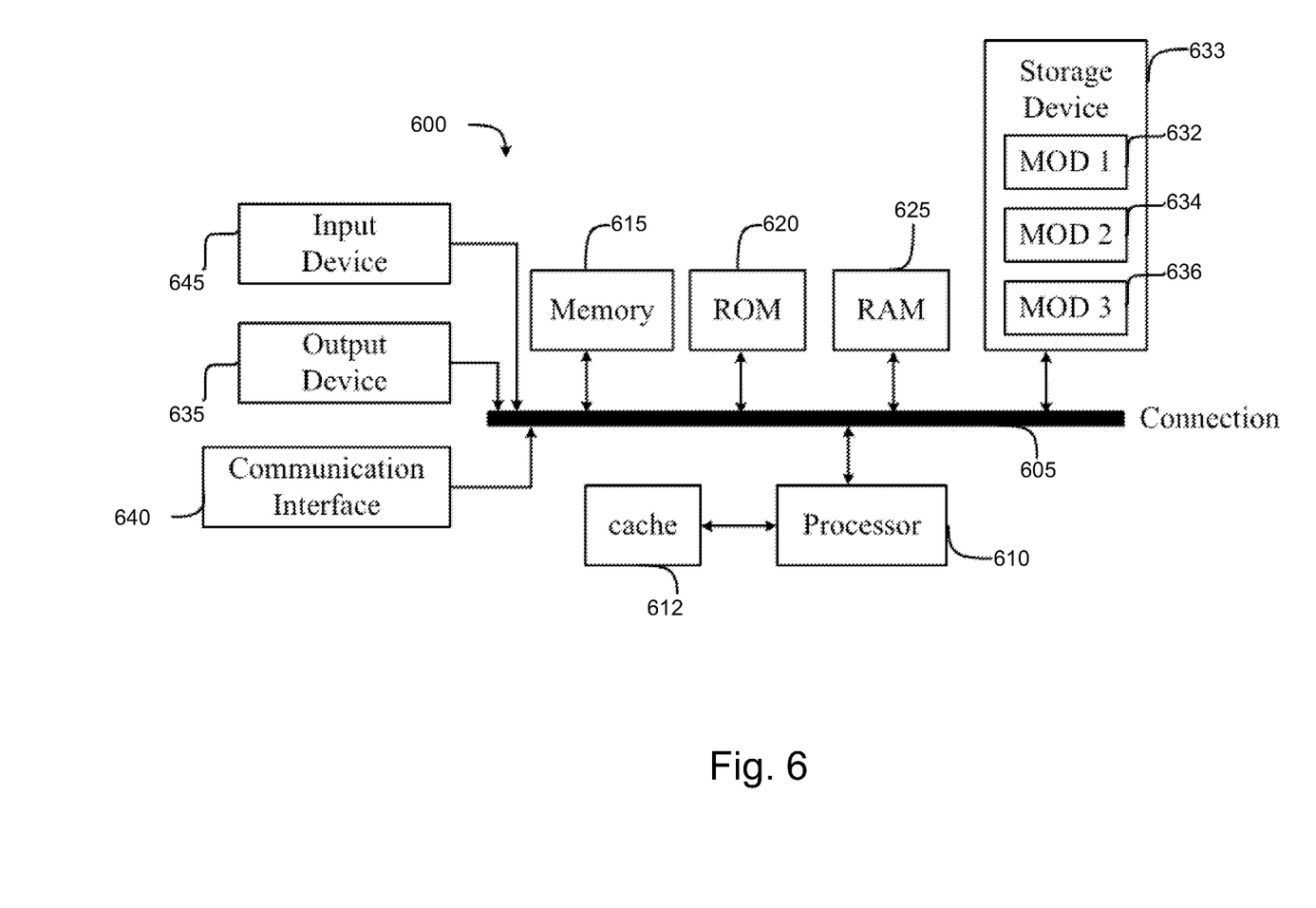
FIG. 6 illustrates an example network device, in accordance with some embodiments of the present technology.
Figure 7:
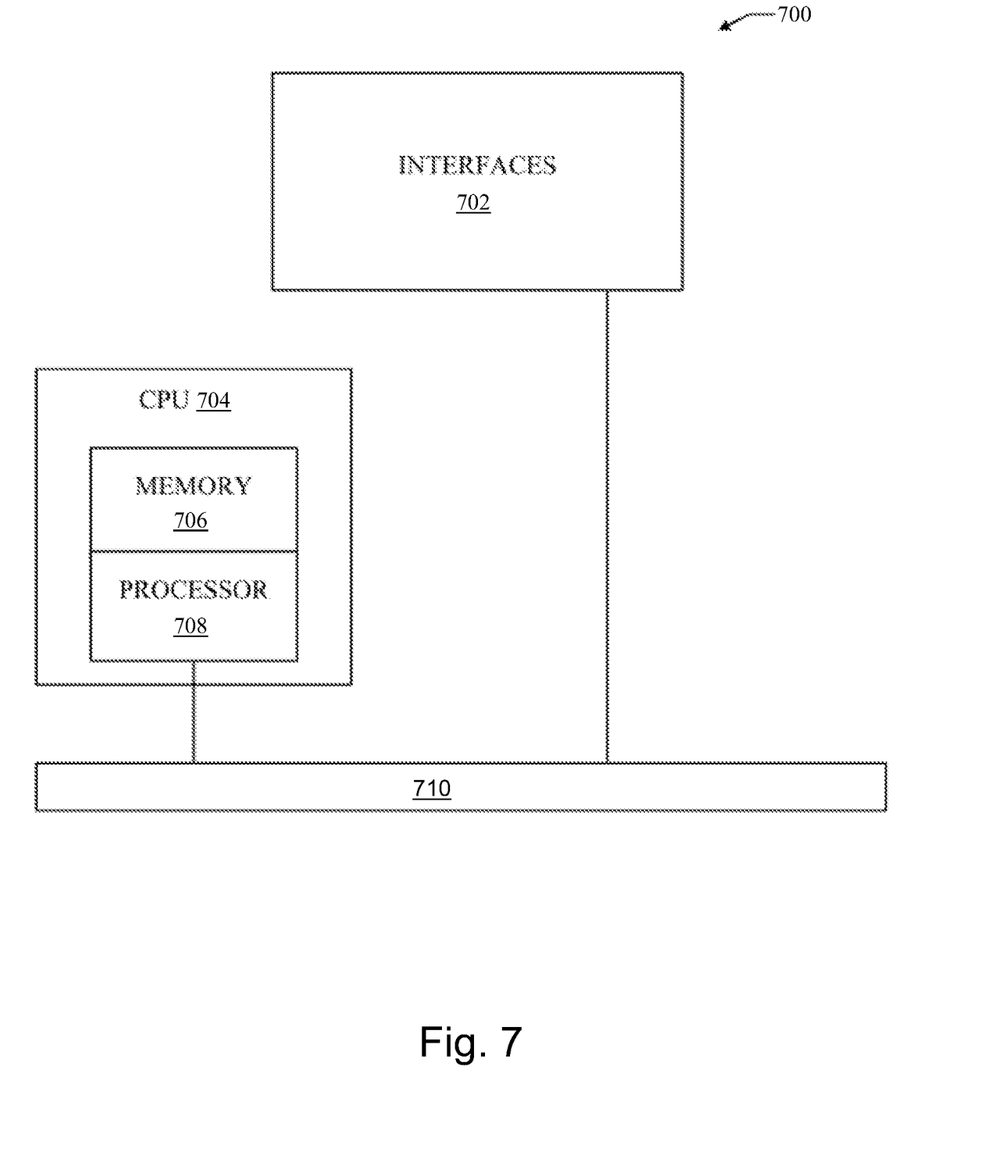
FIG. 7 illustrates an example architecture of a computing device, in accordance with some embodiments of the present technology.

The disclosure now turns to FIGS. 6 and 7, which illustrate example architectures of computing and network devices, such as client computers, switches, routers, controllers, servers, and so forth.

FIG. 6 illustrates a computing system architecture 600 including components in electrical communication with each other using a connection 605, such as a bus. System 600 includes a processing unit (CPU or processor) 610 and a system connection 605 that couples various system components including the system memory 615, such as read-only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read-only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, assurance, and other networking operations. Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X106 family of microprocessors. In some cases, processor 708 can be specially designed hardware for controlling the operations of network device 700. In some cases, a memory 706 (e.g., non-volatile RAM, ROM, TCAM, etc.) also forms part of CPU 704. However, there are many different ways in which memory could be coupled to the system. In some cases, the network device 700 can include a memory and/or storage hardware, such as TCAM, separate from CPU 704. Such memory and/or storage hardware can be coupled with the network device 700 and its components via, for example, connection 710.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto-processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing, switching, and/or other operations. The ASIC can communicate with other components in the network device 700 via the connection 710, to exchange data and signals and coordinate various types of operations by the network device 700, such as routing, switching, and/or data storage operations, for example.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionalities described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for optimizing diagnostic signature detection comprising:
representing each of a plurality of network diagnostic signatures as a sum-of-product Boolean function of one or more network conditions, wherein each of the one or more network conditions is asserted by a respective one of one or more network commands;
sorting each of a plurality of network commands in a decreasing order based on a corresponding frequency of occurrence across the plurality of network diagnostic signatures; and constructing a decision tree for a plurality of sorted network commands to thereby compute a preferred execution sequence for the plurality of network commands;

wherein the decision tree is constructed to issue a network command only when required to evaluate one of the network diagnostic signatures, and will trim any network commands in which assertion of a condition associated with the any network command is redundant in evaluating the one of the network diagnostic signatures.

2. The computer-implemented method of claim 1, wherein the decision tree is compiled automatically from the plurality of network diagnostic signatures expressed as the sum-of-product Boolean function of the one or more network conditions.

3. The computer-implemented method of claim 2, wherein the decision tree is implemented using a formal semantic model that can be processed on a machine reasoning engine.

4. The computer-implemented method claim 3, wherein the formal semantic model is expressed in a Semantic Web Rule Language.

5. The computer-implemented method of claim 1, wherein the sorting of the one or more network commands, in each of one or more Boolean product terms of the sum-of-product Boolean function, is further based on a network cost parameter associated with each of the one or more network commands.

6. The computer-implemented method of claim 5, wherein the cost parameter depends on an amount of network resource and time associated with an acquisition of data corresponding to an output of the network command.

7. A system comprising:
one or more processors; and
at least one computer-readable storage medium having stored therein instructions which, when executed by the one or more processors, cause the system to:
represent each of a plurality of network diagnostic signatures as a sum-of-product Boolean function of one or more network conditions, wherein each of the one or more network conditions is asserted by a corresponding network command;
replace each of the one or more network conditions with the corresponding network command to thereby represent each of the plurality of network diagnostic signatures as a sum of one or more Boolean product terms, each of which is a function of one or more network commands;
sort the one or more network commands, in each of the one or more Boolean product terms, in a decreasing order based on a corresponding frequency of occurrence across the plurality of network diagnostic signatures;
sort the one or more Boolean product terms, in each of the plurality of network diagnostic signatures, in a decreasing order based on a number of network commands specified in each of the one or more Boolean product terms; and
construct a decision tree to compute a preferred execution sequence for the number of network commands to, thereby evaluate each of the plurality of network diagnostic signatures;
wherein the decision tree is constructed to issue a network command only when required to evaluate one of the network diagnostic signatures, and will trim any network commands in which assertion of a condition associated with the any network command is redundant in evaluating the one of the network diagnostic signatures.

8. The system of claim 7, wherein the decision tree is compiled automatically from the plurality of network diagnostic signatures expressed as the sum-of-product Boolean function of the one or more network conditions.

9. The system of claim 8, wherein the decision tree is implemented using a formal semantic model that can be processed on a machine reasoning engine.

10. The system of claim 9, wherein the formal semantic model is expressed in a Semantic Web Rule Language.

11. The system of claim 7, wherein the sorting of the one or more network commands, in each of the one or more Boolean product terms, is further based on a cost parameter associated with each of the one or more network commands.

12. The system of claim 11, wherein the cost parameter depends on an amount of network resource and time associated with an acquisition of data corresponding to an output of each of the one or more network commands.

13. A non-transitory computer-readable storage medium having stored therein instructions which, when executed by one or more processors, cause a system to perform operations comprising:
representing each of a plurality of network diagnostic signatures as a sum-of-product Boolean function of one or more network conditions, wherein each of the one or more network conditions is asserted by a respective one of one or more network commands;
sorting each of a plurality of network commands in a decreasing order based on a corresponding frequency of occurrence across the plurality of network diagnostic signatures; and
constructing a decision tree for a plurality of sorted network commands to thereby compute a preferred execution sequence for the plurality of network commands;
wherein the decision tree is constructed to issue a network command only when required to evaluate one of the network diagnostic signatures, and will trim any network commands in which assertion of a condition associated with the any network command is redundant in evaluating the one of the network diagnostic signatures.

14. The non-transitory computer-readable storage medium of claim 13, wherein the decision tree is compiled automatically from the plurality of network diagnostic signatures expressed as the sum-of-product Boolean function of the one or more network conditions.

15. The non-transitory computer-readable storage medium of claim 14, wherein the decision tree is implemented using a formal semantic model that can be processed on a machine reasoning engine.

16. The non-transitory computer-readable storage medium of claim 15, wherein the formal semantic model is expressed in a Semantic Web Rule Language.

17. The non-transitory computer-readable storage medium of claim 13 wherein the cost parameter depends on an amount of network resource and time associated with an acquisition of data corresponding to an output of each of the one or more network commands.

* * * * *